US011720690B2

(12) United States Patent
Munsil et al.

(10) Patent No.: US 11,720,690 B2
(45) Date of Patent: *Aug. 8, 2023

(54) MODIFICATION OF A SEGMENT OF DATA BASED ON AN ENCRYPTION OPERATION (71) Applicant: Micron Technology, Inc., Boise, ID (US)

(72) Inventors: Jeffrey Munsil, Fort Collins, CO (US); Michael B. Danielson, Georgetown, TX (US)

(73) Assignee: Micron Technology, Inc., Boise, ID (US)

(*) Notice: Subject to any disclaimer, the term of this patent is extended or adjusted under 35 U.S.C. 154(b) by 38 days.

This patent is subject to a terminal disclaimer.

(21) Appl. No.: 17/146,278

(22) Filed: Jan. 11, 2021

(65) Prior Publication Data
US 2021/0133335 A1 May 6, 2021

Related U.S. Application Data (63) Continuation of application No. 16/111,750, filed on Aug. 24, 2018, now Pat. No. 10,909,251.

(51) Int. Cl.
*G06F 21/60* (2013.01)
*H04L 9/08* (2006.01)

(52) U.S. Cl.
CPC ......... *G06F 21/602* (2013.01); *H04L 9/0819* (2013.01)

(58) Field of Classification Search
CPC ........ G06F 21/602; G06F 21/78; G06F 21/72; H04L 9/0819; H04L 9/0618; H04L 9/0894
See application file for complete search history.

(56) References Cited

U.S. PATENT DOCUMENTS

| 6,437,711 | B1 | 8/2002 | Nieminen et al. |
| 7,506,176 | B1 | 3/2009 | Miwa et al. |
| 8,300,823 | B2 | 10/2012 | Bojinov et al. |
| 9,450,923 | B2 | 9/2016 | Klum et al. |
| 10,909,251 | B2* | 2/2021 | Munsil ............ H04L 9/0894 |
| 2009/0006821 | A1 | 1/2009 | Mera et al. |
| 2009/0240925 | A1 | 9/2009 | Ishihara et al. |

(Continued)

OTHER PUBLICATIONS

Babatunde et al.; "Survey of Video Encryption Algorithms", Jun. 2017, Covenant Journal of Informatics & Communication Technology. vol. 5 No. 1, pp. 65-80. (Year: 2017).*

(Continued)

*Primary Examiner* — Matthew Smithers
(74) *Attorney, Agent, or Firm* — Lowenstein Sandler LLP (57) ABSTRACT A processing device of a memory sub-system is configured to receive, from a host system, host data to be stored at a memory sub-system in an encrypted form; determine that the host data exceeds a threshold size associated with an encryption operation; separate the host data into a plurality of segments based on the threshold size associated with the encryption operation; determine that a particular segment of the plurality of segments does not satisfy a size requirement of data associated with the encryption operation; modify the particular segment to satisfy the size requirement of data associated with the encryption operation; encrypt each of the plurality of segments based on the encryption operation; and store the encrypted plurality of segments at the memory sub-system.

20 Claims, 8 Drawing Sheets (56) References Cited

U.S. PATENT DOCUMENTS

| | | |
|---|---|---|
| 2010/0031014 A1 | 2/2010 | Senda |
| 2010/0074441 A1* | 3/2010 | Pauker .................. H04L 9/0625 |
| | | 713/168 |
| 2010/0138670 A1* | 6/2010 | Shinbori .......... G11B 20/00086 |
| | | 713/189 |
| 2010/0229004 A1* | 9/2010 | Asnaashari ............. G06F 21/78 |
| | | 713/193 |
| 2010/0246709 A1 | 9/2010 | Lillibridge et al. |
| 2010/0313040 A1 | 12/2010 | Lumb |
| 2011/0314304 A1 | 12/2011 | Braams |
| 2012/0027198 A1* | 2/2012 | He ........................... H04L 9/06 |
| | | 380/28 |
| 2013/0091237 A1 | 4/2013 | Arulambalam et al. |
| 2013/0097432 A1 | 4/2013 | Cerruti et al. |
| 2014/0136832 A1* | 5/2014 | Klum .................. G06F 11/1451 |
| | | 713/150 |
| 2014/0355754 A1* | 12/2014 | Leung .................... H04L 9/065 |
| | | 380/28 |
| 2015/0310219 A1 | 10/2015 | Haager et al. |
| 2019/0102103 A1 | 4/2019 | Ari et al. |
| 2019/0303241 A1 | 10/2019 | Keller et al. |

OTHER PUBLICATIONS

Plotkin Serge et al: "Standard for Cryptographic Protection of Data on Block-Oriented Storage Devices", May 16, 2007 (May 16, 2007), XP055903684, Retrieved from the Internet: URL:http://libeccio.di.unisa.it/Crypto14/Lab/p1619.pdf [retrieved on Mar. 21, 2022].

PCT International Search Report and Written Opinion for International Application No. PCT/US2019/048009, dated Dec. 11, 2019, 12 pages.

* cited by examiner

MODIFICATION OF A SEGMENT OF DATA BASED ON AN ENCRYPTION OPERATION

RELATED APPLICATIONS

This application is a continuation of U.S. patent application Ser. No. 16/111,750, filed Aug. 24, 2018, the entire contents of which is hereby incorporated by reference herein.

TECHNICAL FIELD

The present disclosure generally relates to a memory sub-system, and more specifically, relates to the modification of a segment of data based on an encryption operation in memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to the modification of a segment of data based on an encryption operation. A memory sub-system is also hereinafter referred to as a "memory device." An example of a memory sub-system is a storage system, such as a solid-state drive (SSD). The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

In a conventional memory sub-system, data that is received from the host system (i.e., host data) can be encrypted before being stored at the memory sub-system. For example, the memory sub-system can utilize an encryption operation to encrypt host data (i.e., plaintext) and can store the encrypted host data (i.e., ciphertext) at a memory component included in the memory sub-system. In general, a conventional memory sub-system can receive host data as data blocks of the same size. Each data block of the host data can then be encrypted and stored at the memory sub-system.

The encryption operation utilized by the conventional memory sub-system can operate on data blocks based on certain constraints such as the size of the data blocks. For example, the encryption operation can encrypt data blocks that are less than or equal to a threshold size but cannot be used to securely encrypt data blocks that are larger than the threshold size. Certain host systems can provide host data as data blocks at a large size that exceeds the threshold size utilized by the encryption operation. Thus, if the conventional memory sub-system is utilized by a host system that provides the host data as data blocks of a large size that exceeds the capability of the encryption operation utilized by the conventional memory sub-system, then the memory sub-system will not be able to encrypt the host data.

Aspects of the present disclosure address the above and other deficiencies by separating the host data into different segments of data and modifying a segment of data based on an encryption operation. For example, the memory sub-system can receive host data that is of a size that is larger than the threshold size constraint of the encryption operation. The memory sub-system can divide or separate the host data into multiple segments of data based on the threshold size constraint utilized by the encryption operation. Thus, the host data can be received at a size that is larger than the threshold size constraint of the encryption operation and can be divided into multiple segments of data where each segment of data is less than or equal to the threshold size constraint of the encryption operation.

As an example, the threshold size constraint of the encryption operation can be 16 megabytes (MB) and the received host data can be slightly over 80 MB (e.g., 80 MB with an additional 15 bytes or 80.000015 MB). In some embodiments, the host data can be separated into five segments of 16 MB each and the remaining segment can be 15 bytes in size. In some embodiments, the encryption operation can also specify a minimum size of a segment of data that can be encrypted by the encryption operation. Thus, if 15 bytes is below the minimum size, then data from another segment of data that was separated at the 16 MB of size can be adjusted so that a portion of the segment of data at 16 MB can be removed and provided to the last segment of data that was at 15 bytes. For example, a portion (e.g., 16 bytes) from the 16 MB can be removed and added to the segment that was at 16 bytes so that the new segment is now 31 bytes and can be encrypted. In the same or alternative embodiments, padding data can be added to segments that are below the minimum size so that the new segment with the padding data is at or above the minimum size to be encrypted.

Advantages of the present disclosure include, but are not limited to, the improved security of host data from host systems that provide host data at larger and/or variable sizes. Since the host data at a larger size can be separated into segments of data and adjusted based on the constraints of the encryption operation, the host data of any size can be separated into segments that can be encrypted and stored at a memory sub-system. Thus, the memory sub-system can be utilized with host systems that provide host data at smaller sizes as well as other host systems that can provide host data at relatively larger sizes. Thus, the memory sub-system can be considered more flexible as the memory sub-system can securely store the host data from different types of host systems.

Figure 1:
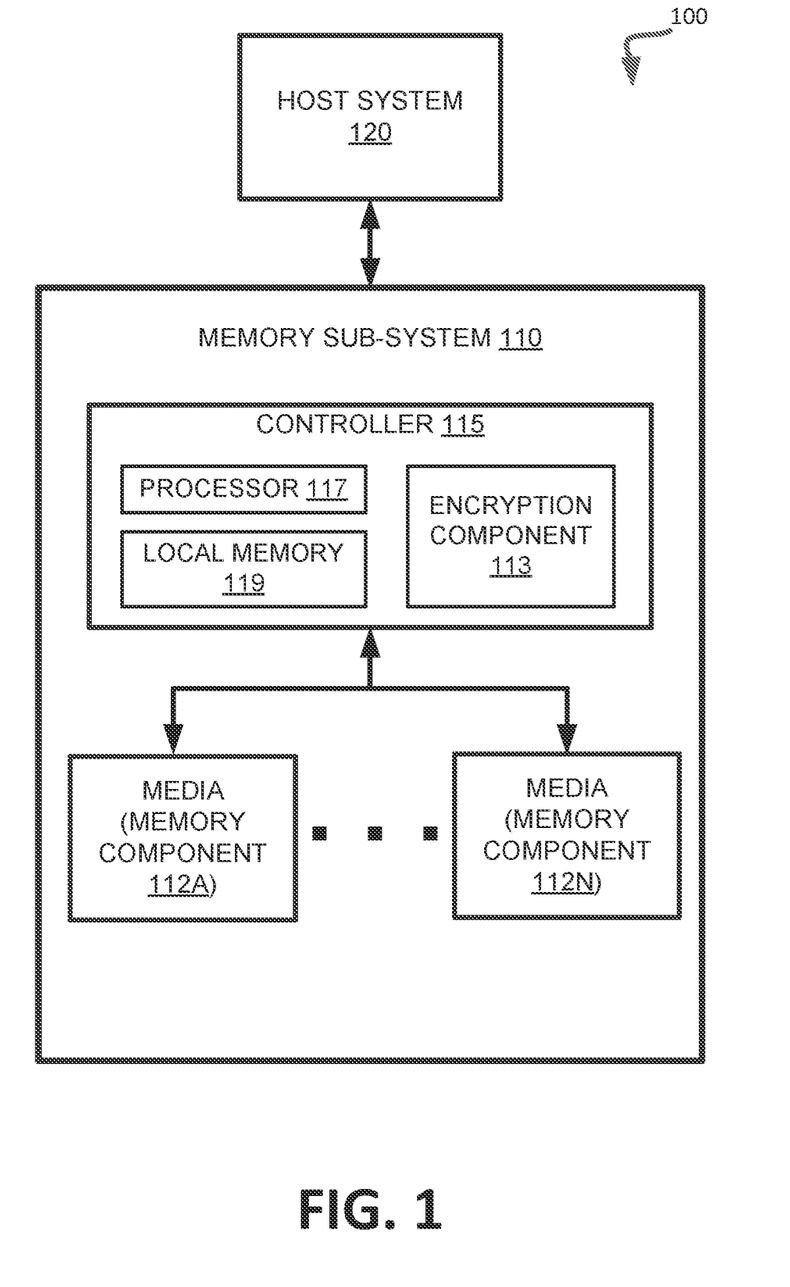
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an encryption component 113 that can separate host data received from the host system 120 into segments of data that are to be encrypted and stored at the memory components 112A to 112N. In some embodiments, the controller 115 includes at least a portion of the characteristic component 113. For example, the controller 115 can include a processor 117 (processing device) configured to execute instructions stored in local memory 119 for performing the operations described herein. In some embodiments, the characteristic component 113 is part of the host system 110, an application, or an operating system.

The memory sub-system 110 can include an encryption component 113 (e.g., circuitry, dedicated logic, programmable logic, firmware, etc.) to perform the operations described herein. In some implementations, the encryption component 113 can receive host data from the host system 120 and can separate the host data into multiple segments of data based on the constraints of an encryption operation performed by the encryption component 113. The segments of data can be adjusted in size based on the encryption operation or padding data can be added to a segment of data based on the encryption operation. Further details with regards to the operations of the encryption component 113 are described below.

Figure 2:
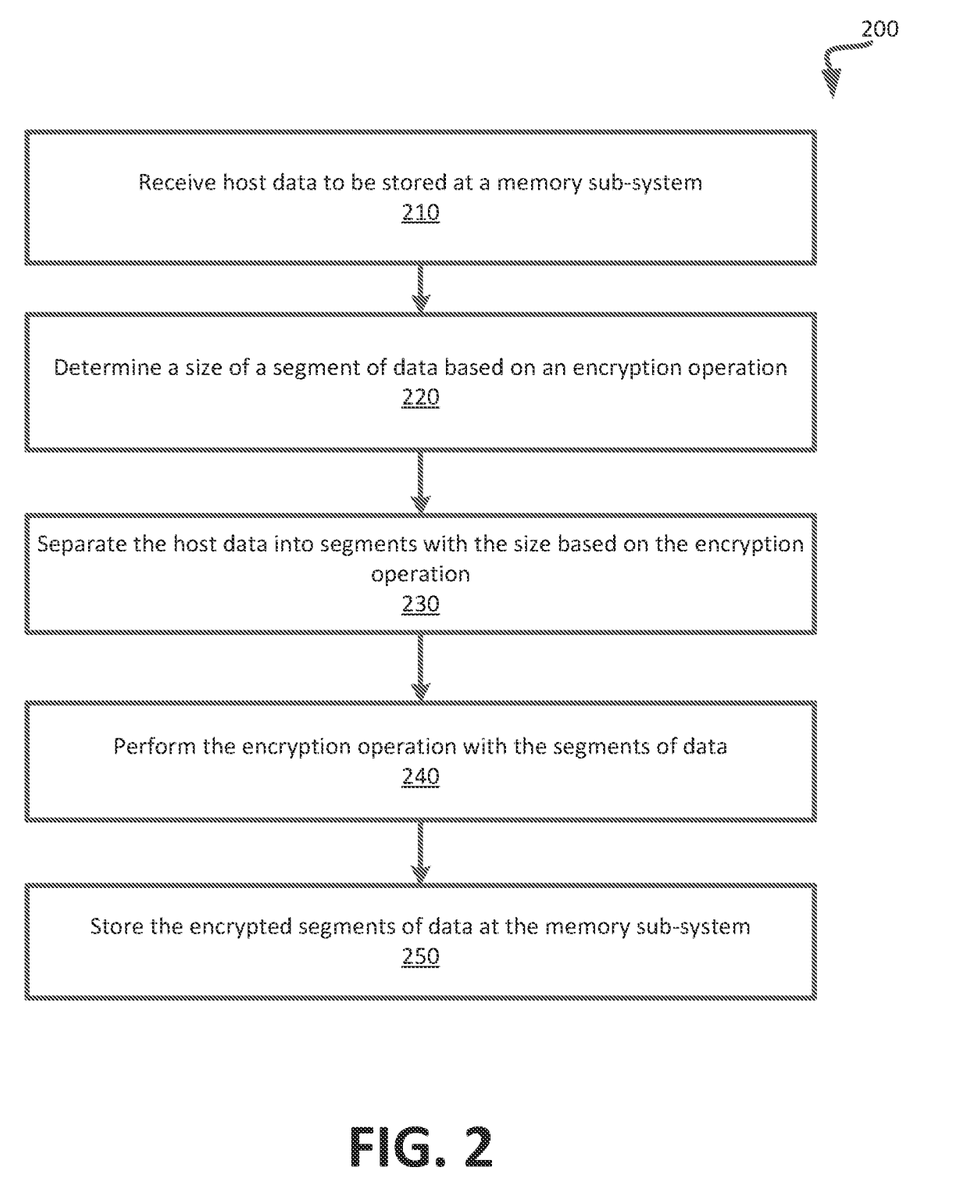
FIG. 2 is a flow diagram of an example method to modify a segment of data based on an encryption operation in accordance with some embodiments.

FIG. 2 is a flow diagram of an example method 200 to modify a segment of data based on an encryption operation in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the encryption component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at block 210, the processing logic receives host data to be stored at a memory sub-system. The host data can be received from a host system that utilizes the memory sub-system. The host data can be provided at a data size that is larger than a constraint or requirement of an encryption operation that is used by the memory sub-system. For example, the encryption operation can be a block cipher operation that operates on fixed-length numbers of bits (i.e., a block) and the host data provided by the host system can be at size that is larger than the length of the block that the encryption operation can be performed on. An example of such an encryption operation can be, but is not limited to, Advanced Encryption Standard (AES) that utilizes an Xor-encrypt-xor (XEX)-based tweaked-codebook mode with ciphertext stealing (XTS-AES).

At block 220, the processing logic determines a size of a segment of data based on an encryption operation. The size of the segment of data can be a requirement or constraint of the encryption operation. For example, the size of the segment of data can be the maximum size of a block that the encryption operation can be performed on to encrypt data. In some embodiments, the encryption operation can also specify a minimum size of data that the encryption operation can be performed on to encrypt data. As an example, the maximum size can be 16 MB and the minimum size can be 16 bytes. At block 230, the processing logic separates the host data into segments with the size based on the encryption operation. For example, the host data can be divided into multiple segments where each segment is at the maximum size of the data that the encryption operation can be performed on. In some embodiments, if the host data is not evenly divided by the maximum size of the data that the encryption operation can be performed on, then the host data can be divided into multiple segments that are at the maximum size and the last segment can be less than the maximum size. Data from a segment can be removed and provided to another segment as described in conjunction with FIGS. 3B and 4. In the same or alternative embodiments, padding data can be added to a segment as described in conjunction with FIGS. 3C and 5.

Referring to FIG. 2, at block 240 the processing logic performs the encryption operation with the segments of data and, at block 250, the processing logic stores the encrypted segments of data at the memory sub-system. Thus, host data of a size that exceeds a constraint of an encryption operation is received and the host data is separated or divided into segments that satisfy the constraints or requirements of the encryption operation.

The encryption of the segments of data can utilize the XTS-AES encryption operation. In some embodiments, the XTS-AES encryption operation can encrypt each segment based on a first cryptographic key, a second cryptographic key, and a tweak value. Each segment of data can be encrypted by using the first cryptographic key and the second cryptographic key and a different tweak value. For example, a first segment of the data can be encrypted by the XTS-AES encryption operation with the first and second cryptographic keys and a first tweak value. For the next segment of the data, the first tweak value can be incremented to generate a second tweak value. The next segment of data can be encrypted with the same first and second cryptographic keys and the second tweak value. For each subsequent segment of data, the tweak value can be incremented and used to encrypt the respective segment of data.

Figure 3A:
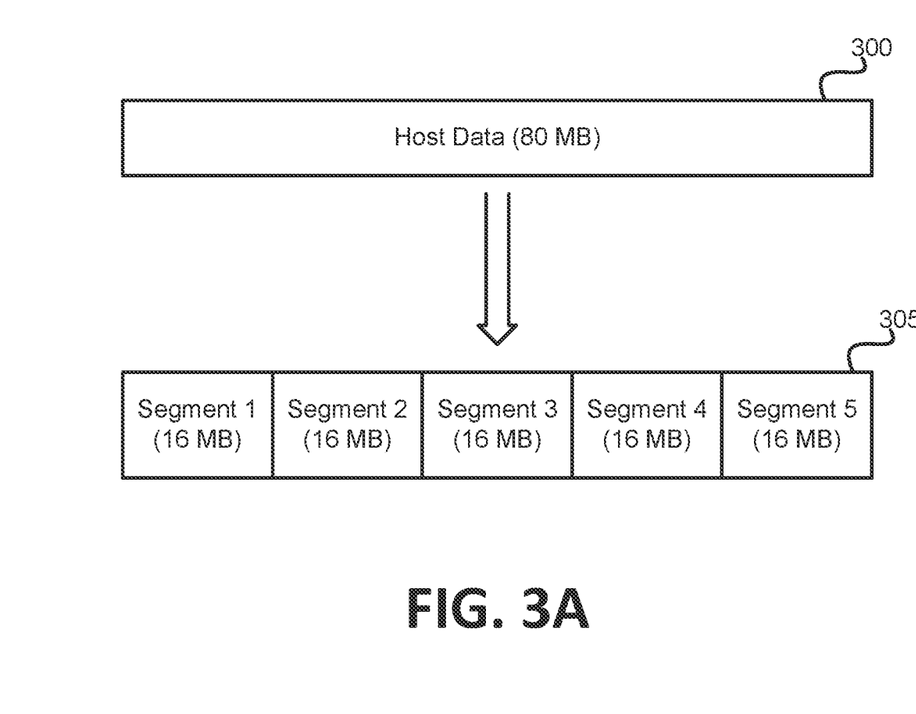
FIG. 3A illustrates an example of separating data received from a host system into segments based on an encryption operation in accordance with some embodiments of the present disclosure.

FIG. 3A illustrates an example of separating host data received from a host system into segments based on an encryption operation in accordance with some embodiments of the present disclosure. The host data can be separated into segments by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the separation of the host data into segments is performed by the encryption component 113 of FIG. 1.

As shown in FIG. 3A, host data 300 can be received. The host data 300 can be provided by a host system that indexes data at a larger size than requirement or constraint of the encryption operation. For example, the host data 300 can be the data of a logical address that is utilized by the host system. The memory sub-system can receive the host data 300 and can divide or separate the host data 300 into multiple segments of data. For example, if the maximum size of data that the encryption operation can encrypt is 16 MB and if the host data 300 is 80 MB in size, then the host data 300 can be separated into five segments of data that are each 16 MB in size.

Figure 3B:
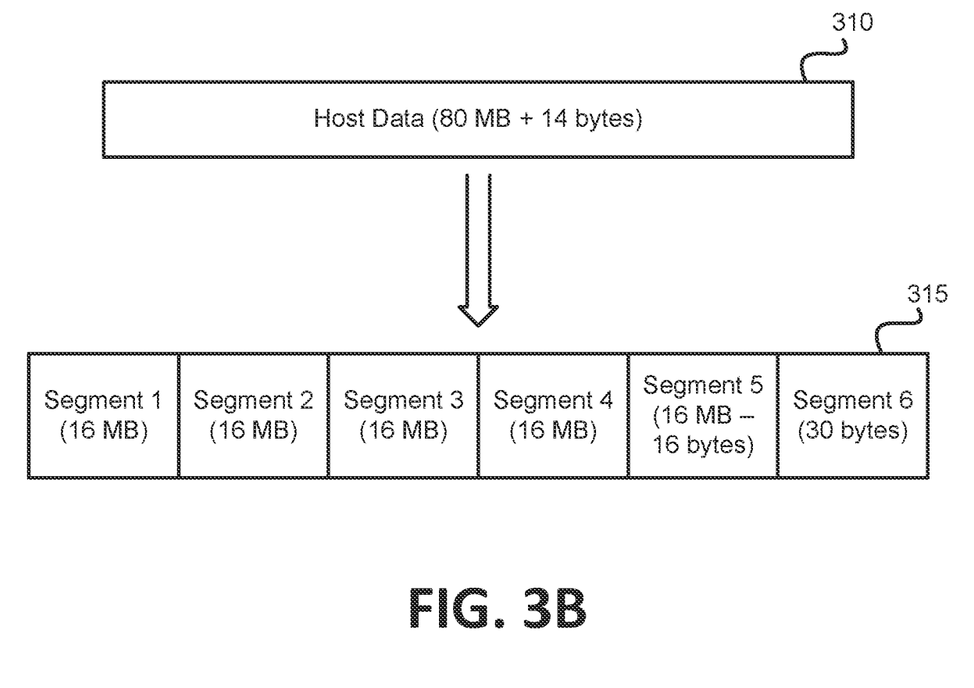
FIG. 3B illustrates the adjusting of a segment of data based on an encryption operation in accordance with some embodiments of the present disclosure.

FIG. 3B illustrates the adjusting of a segment of data based on an encryption operation and in accordance with some embodiments of the present disclosure. The segments of data can be adjusted by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the adjusting of the segments of data is performed by the encryption component 113 of FIG. 1.

As shown in FIG. 3B, host data 310 can be at a size of 80 MB and 14 bytes when the maximum size of data that the encryption operation can encrypt is 16 MB. The host data can be separated into five segments of 16 MB each (e.g., five segments of the maximum size) and the remaining data of 14 bytes can be provided in a final or last segment. In some embodiments, the data of the final or last segment can be encrypted in an AES-XTS implementation as 16 bytes and the remaining bytes can utilize cyphertext stealing (CTS). In some embodiments, the encryption operation can be based on a minimum size of data. The minimum size of data can specify a minimum amount of data that can be encrypted by the encryption operation. In some embodiments, the minimum size can be a unit of data used by the encryption operation. The data from the fifth segment (e.g., the second to last segment) can be removed based on the size of the encryption unit and added to the last segment of data so that the last segment of data is larger than the minimum size of data that can be utilized by the encryption operation. Thus, the last two segments can be smaller in size than the prior segments of data so that each segment satisfies the maximum size and the minimum size of the encryption operation.

Figure 3C:
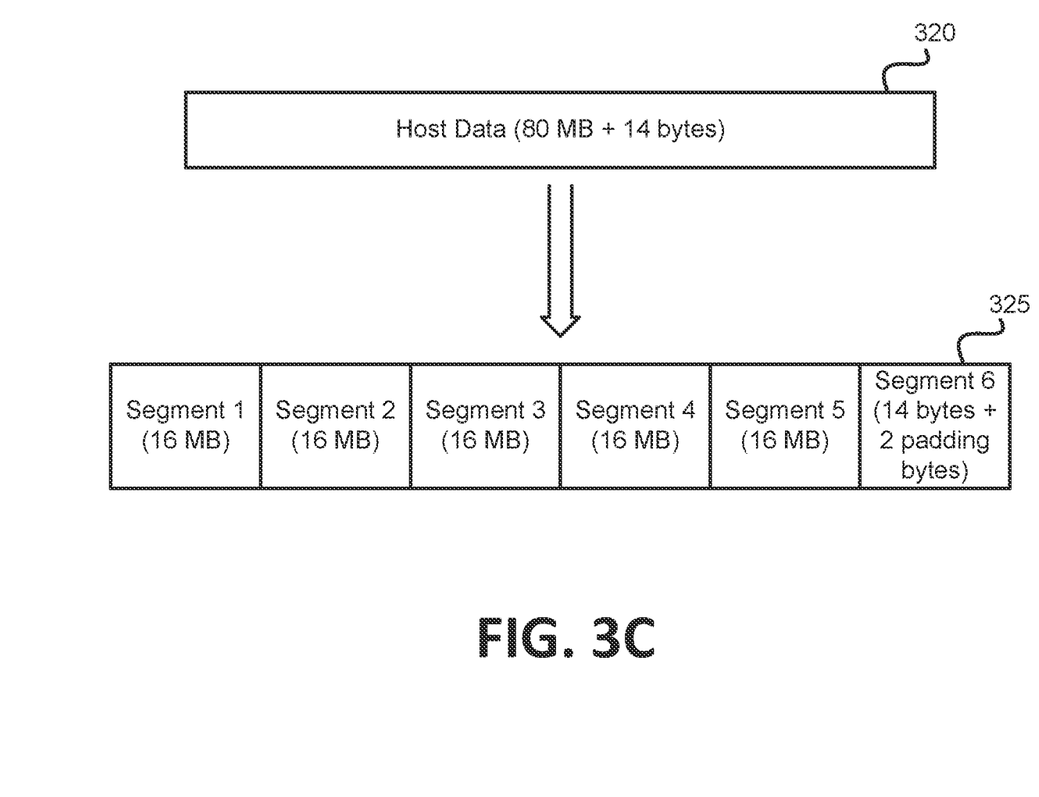
FIG. 3C illustrates the adjusting of a segment of data by adding padding data to a segment based on an encryption operation in accordance with some embodiments of the present disclosure.

FIG. 3C illustrates the adjusting of a segment of data by adding padding data to a segment based on an encryption operation in accordance with some embodiments of the present disclosure. The segment of data can be adjusted by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the adjusting of the segment of data is performed by the encryption component 113 of FIG. 1.

As shown in FIG. 3C, host data 320 can be 80 MB and 14 bytes which results in the host data 320 being separated into five segments of equal size (e.g., at the maximum size) and the last segment can be at 14 bytes or less than the minimum size. Additional data can be added to the last segment so that the last segment satisfies the minimum size used by the encryption operation. For example, if the minimum size is 16 bytes, then two additional padding bytes can be added to the last segment of data to increase the size of the last segment of data.

Figure 4:
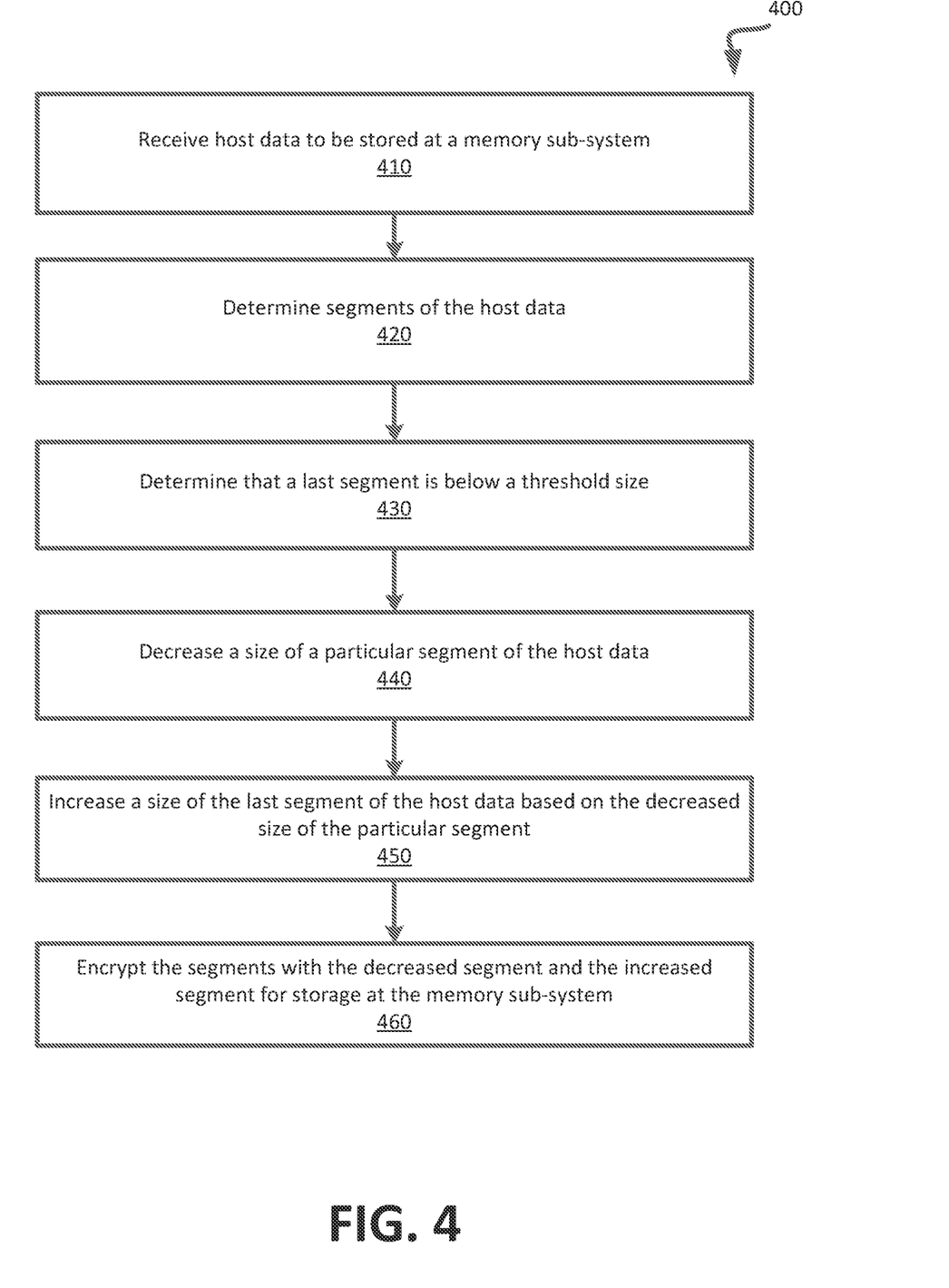
FIG. 4 is a flow diagram of an example method to adjust a segment of data based on an encryption operation in accordance with some embodiments.

FIG. 4 is a flow diagram of an example method 400 to adjust a segment of data based on an encryption operation in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the encryption component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at block 410, the processing logic receives host data to be stored at a memory sub-system and, at block 420, determines segments of the host data as previously described. At block 430, the processing logic determines that a last segment is below a threshold size. For example, a segment of the host data can be below a minimum size of an encryption unit of the encryption operation. At block 440, the processing logic decreases a size of a particular segment of the host data. For example, a segment of data that is prior to the last segment of data can be reduced by an amount corresponding to a size of the encryption unit. For example, data can be removed from the segment of host data to the last segment of data. Subsequently, at block 450, the processing logic increases a size of the last segment of the host data based on the decreased size of the particular segment. For example, the data that is removed from the prior segment of host data can be added to the last segment of the host data. Subsequently, at block 460, the processing logic encrypts the segments with the decreased segment and the increased segment for storage at the memory sub-system.

Figure 5:
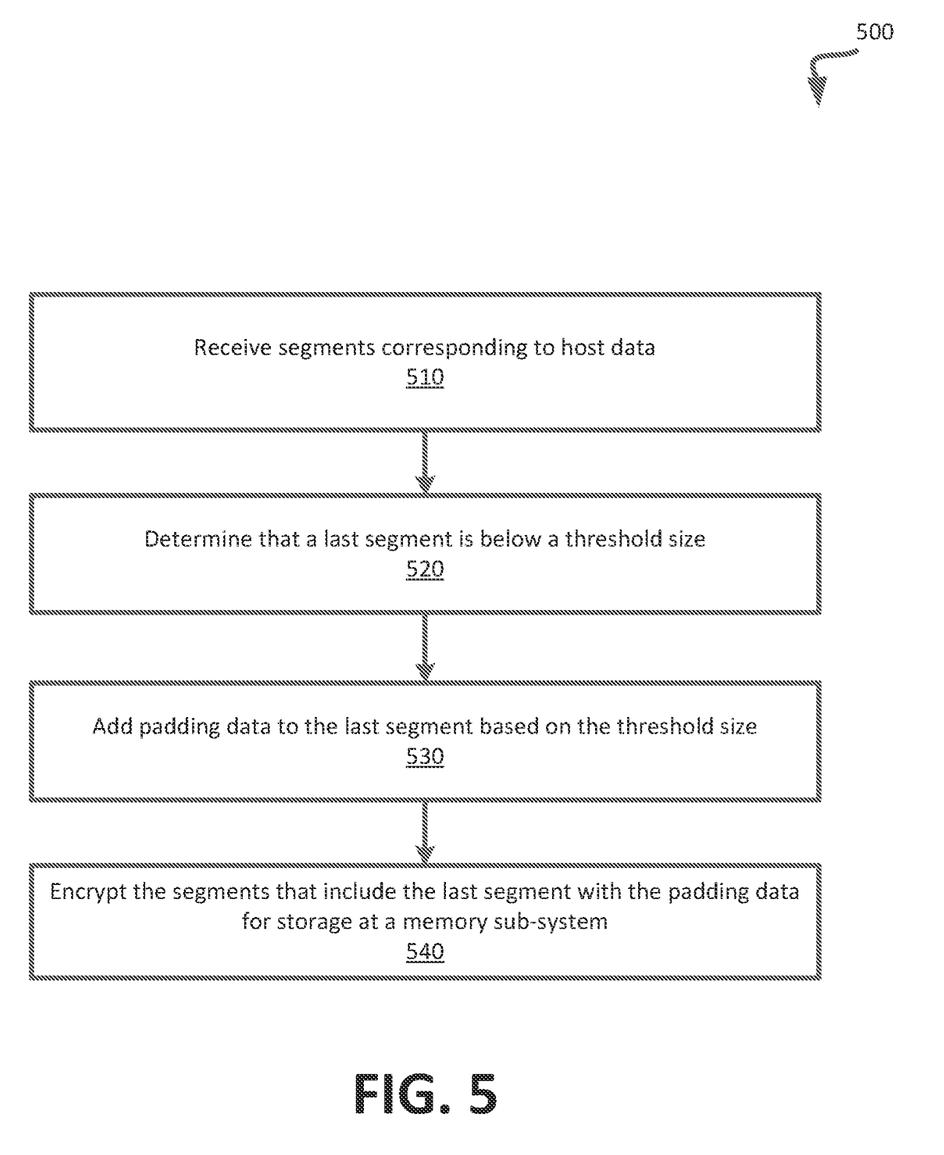
FIG. 5 is a flow diagram of a method to add padding data to a segment of data based on an encryption operation in accordance with some embodiments.

FIG. 5 is a flow diagram of a method 500 to add padding data to a segment of data based on an encryption operation in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the encryption component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 5, at block 510, the processing logic receives segments corresponding to the host data. For example, the host data can be separated into multiple segments as previously described. At block 520, the processing logic determines that a last segment of the host data is below a threshold size. For example, the last segment of data can be less than a size of an encryption unit of the encryption operation. At block 530, the processing logic adds padding data to the last segment based on the threshold size. For example, padding data can be added to the last segment of data so that the last segment of data is at least equal to the threshold size. In some embodiments, the padding data can be dummy data or random values that are added to the data of the last segment. The padding data may be random values with respect to the host data. Subsequently, at block 540, the processing logic encrypts the segments that include the last segment with the padding data for storage at the memory sub-system.

Figure 6:
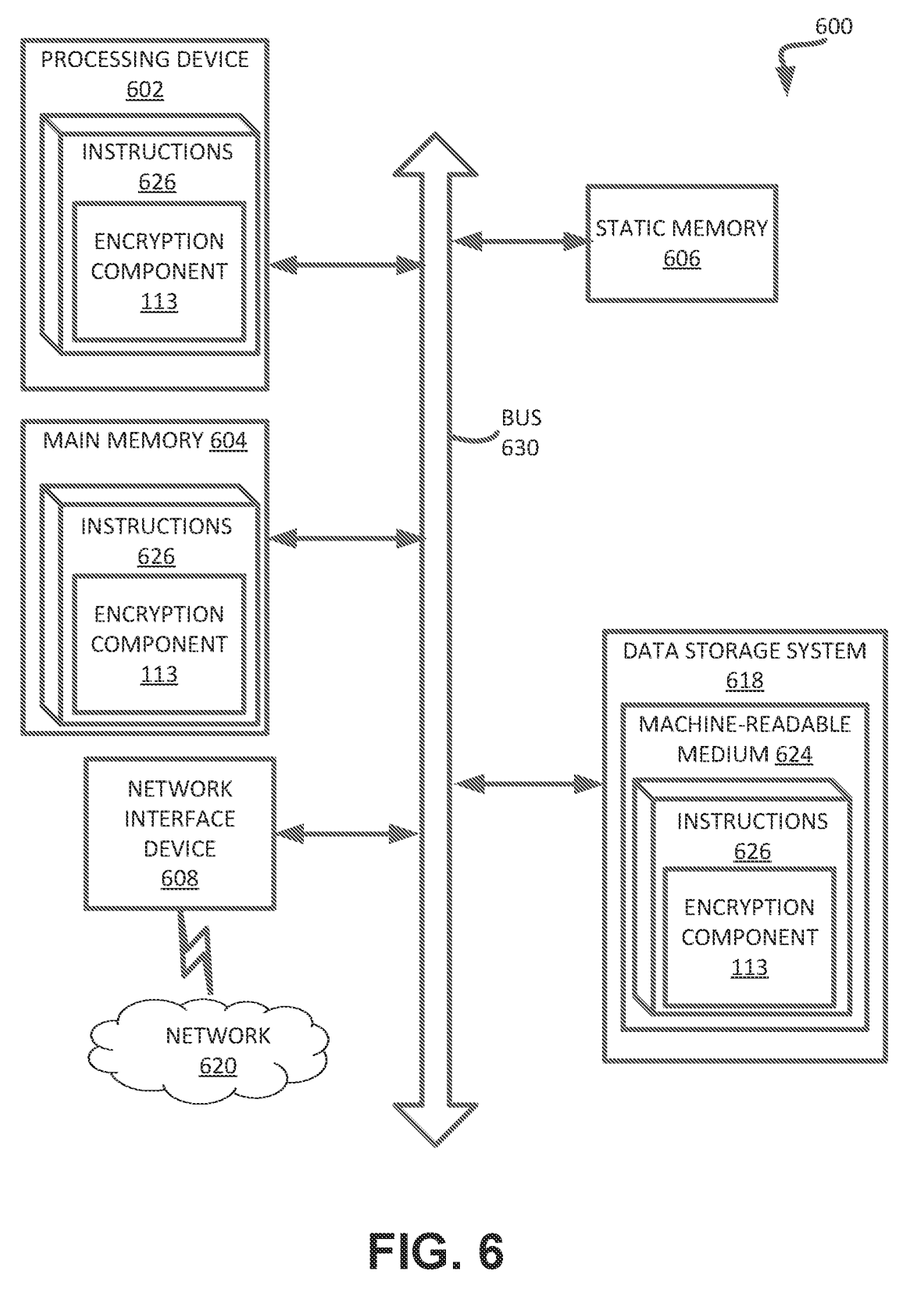
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the encryption component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an encryption component (e.g., the encryption component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, from a host system, host data to be stored at a memory sub-system in an encrypted form;
   determining that the host data exceeds a threshold size associated with an encryption operation;
   separating, by a processing device, the host data into a plurality of segments based on the threshold size associated with the encryption operation;
   determining that a particular segment of the plurality of segments does not satisfy a size requirement of data associated with the encryption operation;
   modifying the particular segment to satisfy the size requirement of data associated with the encryption operation;
   encrypting each of the plurality of segments based on the encryption operation; and
   storing the encrypted plurality of segments at the memory sub-system.

2. The method of claim 1 further comprising:
   in response to determining that the particular segment does not satisfy the size requirement, removing a portion of data from a prior segment and adding the removed portion to the particular segment, wherein the size requirement comprise a minimum size requirement, and wherein the particular segment with the added portion satisfies the minimum size of data associated with the encryption operation.

3. The method of claim 1, wherein modifying the particular segment further comprises:
   adding padding data to the particular segment, wherein the particular segment with the added padding data satisfies the minimum size of data associated with the encryption operation.

4. The method of claim 1, wherein the threshold size associated with the encryption operation corresponds to a maximum size of data that is to be encrypted by using the encryption operation.

5. The method of claim 1, wherein encrypting each of the plurality of segments based on the encryption operation comprises:
   receiving at least one cryptographic key and an additional value; and
   encrypting a particular segment of the plurality of segments with the encryption operation by using the at least one cryptographic key and the additional value.

6. The method of claim 5, wherein encrypting each of the plurality of segments based on the encryption operation further comprises:
   incrementing the additional value after encrypting the particular segment; and
   encrypting a subsequent segment of the plurality of segments with the encryption operation by using the at least one cryptographic key and the incremented additional value.

7. The method of claim 1, wherein the host data is indexed by a host system at a size that exceeds the threshold size.

8. A system comprising:
   a memory component; and
   a processing device, operatively coupled with the memory component, to:
   receive host data to be stored at a memory sub-system in an encrypted form;
   determine that the host data exceeds a threshold size associated with an encryption operation;
   separate the host data into a plurality of segments based on the threshold size associated with the encryption operation;
   determine that a particular segment of the plurality of segments does not satisfy a size requirement of data associated with the encryption operation;
   modify the particular segment to satisfy the size requirement of data associated with the encryption operation;
   encrypt each of the plurality of segments based on the encryption operation; and
   store the encrypted plurality of segments at the memory sub-system.

9. The system of claim 8, wherein the processing device is further to:
   in response to determining that the particular segment does not satisfy the size requirement, remove a portion of data from a prior segment and adding the removed portion to the particular segment, wherein the particular segment with the added portion satisfies the size requirement of data associated with the encryption operation.

10. The system of claim 8, wherein to modify the particular segment, the processing device is further to:
    add padding data to the particular segment, wherein the particular segment with the added padding data satisfies the size requirement of data associated with the encryption operation.

11. The system of claim 8, wherein the threshold size associated with the encryption operation corresponds to a maximum size of data that is to be encrypted by using the encryption operation.

12. The system of claim 8, wherein to encrypt each of the plurality of segments based on the encryption operation, the processing device is further to:
    receive at least one cryptographic key and an additional value; and
    encrypt a particular segment of the plurality of segments with the encryption operation by using the at least one cryptographic key and the additional value.

13. The system of claim 12, wherein to encrypt each of the plurality of segments based on the encryption operation, the processing device is further to:

increment the additional value after encrypting the particular segment; and encrypt a subsequent segment of the plurality of segments with the encryption operation by using the at least one cryptographic key and the incremented additional value.

14. The system of claim 8, wherein the host data is indexed by a host system at a size that exceeds the threshold size.

15. A non-transitory computer readable medium comprising instructions, which when executed by a processing device, cause the processing device to perform operations comprising:

receiving host data at a memory sub-system;

separating the host data into a plurality of segments based on an encryption operation;

determining that a last segment of the plurality of segments is below a size requirement of data associated with the encryption operation;

modifying the last segment to satisfy the size requirement;

encrypting the plurality of segments with the modified last segment based on the encryption operation; and storing the encrypted plurality of segments at the memory sub-system.

16. The non-transitory computer readable medium of claim 15, wherein to modify the last segment, the operations further comprise:

removing a portion of data from a prior segment and adding the removed portion to the last segment, wherein the last segment with the added portion satisfies the size requirement of data associated with the encryption operation.

17. The non-transitory computer readable medium of claim 15, wherein to modify the last segment, the operations further comprise:

adding padding data to the last segment, wherein the last segment with the added padding data satisfies the size requirement of data associated with the encryption operation.

18. The non-transitory computer readable medium of claim 15, wherein the size requirement associated with the data corresponds to a minimum size of data that is to be encrypted by using the encryption operation.

19. The non-transitory computer readable medium of claim 15, wherein to encrypt each of the plurality of segments based on the encryption operation, the operations further comprise:

receiving at least one cryptographic key and an additional value;

encrypting a particular segment of the plurality of segments with the encryption operation utilizing the at least one cryptographic key and the additional value;

incrementing the additional value after encrypting the particular segment; and encrypting a subsequent segment of the plurality of segments with the encryption operation utilizing the at least one cryptographic key and the incremented additional value.

20. The non-transitory computer readable medium of claim 15, wherein the host data is indexed by a host system at a size that exceeds a threshold size.

* * * * *